G. W. CLAYTON.

Improvement in Constructing Houses.

No. 128,464.  Patented July 2, 1872.

WITNESS..

INVENTOR.

UNITED STATES PATENT OFFICE.

GEORGE W. CLAYTON, OF CLEVELAND, OHIO.

IMPROVEMENT IN CONSTRUCTING HOUSES.

Specification forming part of Letters Patent No. 128,464, dated July 2, 1872.

SPECIFICATION.

I, GEORGE W. CLAYTON, of Cleveland, in the county of Cuyahoga and State of Ohio, have invented a new and Improved Mode of Building Houses, of which the following is a specification:

This invention relates to the manner of preparing the lumber and in the manner of putting the same together for the construction of houses for dwellings and other purposes. The invention is fully set forth in the following description and in the accompanying drawing, in which—

Figure 1:
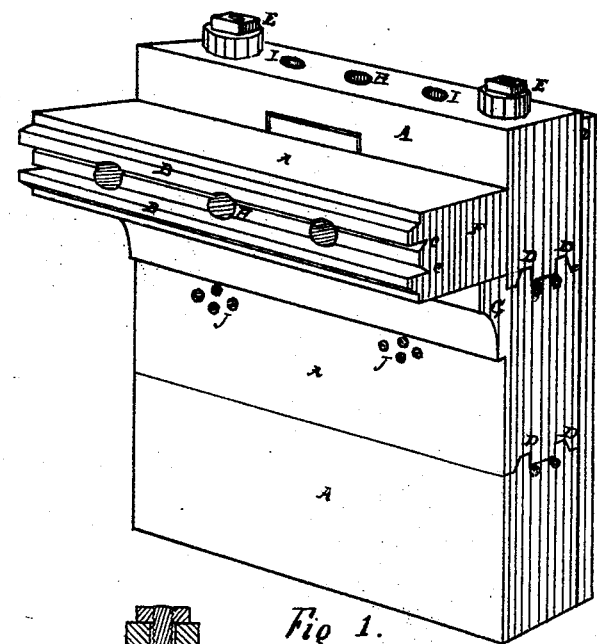
Figure 2:
Figure 3:
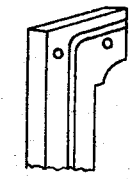

Figure 1 is a representation of a portion of the wall and floor, showing the manner of securing the various parts. Fig. 2 is a detached section, showing the bolts which secure the planks together. Fig. 3 is a part of the molding used around door and window casings and on the outside corners.

A A are planks of suitable thickness for the size of building to be erected, the edges of which are to be tongued and grooved, as represented in Fig. 1. The tongues, which are on one edge of the planks, consist of two tongues or ribs, B B, the outside surfaces of which are beveled, as shown, the groove between said tongues having two three-cornered grooves, C C, cut at the side for the purpose of packing the joints. The opposite edge is provided with two grooves, D D, corresponding in shape to the two tongues on the other edge. To secure these planks together holes are bored through them from edge to edge, at suitable intervals, through which bolts E E are placed. These bolts may be arranged so as to secure any number of widths of planks; or they may be short, and arranged at suitable intervals for convenience in putting up the structure and for giving strength to the same. Where the floor-planks F meet the wall the plank is cut with a molding, G, on the side, which forms a ledge for the floor to rest upon. The floor is constructed of the same material as the wall, and is tied together with tie-rods like the walls. For the purpose of inserting gas and water pipes holes H H are made in the walls and floor, in which are placed the pipes in the course of constructing a building. Ventilation is also provided for by holes I I through the wall, which pass down and meet openings J J in the wall near the top of the room, just under the molding. To provide for the expansion and contraction of the tie-rods, and still retain their binding force on the planks, a piece of rubber or spiral metal spring, K, is placed in a countersunk opening in the planks at the end of the rods, near the nuts. The moldings or casing-strips, Fig. 3, are provided with a small groove, in which is placed a strip of packing, which effectually prevents air or dust passing under them. They are used around all the doors, windows, and corners.

By this mode of construction a very tight joint is made wherever the planks are united. The tongues and grooves being beveled enable them to be drawn together so as to be certain of contact, and the packing prevents the passage of air or dust, thus making a very warm and comfortable house.

I claim—

The construction of the walls and floors of houses of planks A A F, having the peculiar tongued and grooved and packed joints herein described, and bound together by tie-rods E, with springs K, all substantially as and for the purpose set forth.

G. W. CLAYTON.

Witnesses:
WILLIAM CLARK,
C. L. GRIFFIN.